Oct. 7, 1969     P. BOUTHORS ET AL     3,470,949

TUBULAR FINNED RADIATOR

Filed April 13, 1967

United States Patent Office 3,470,949
Patented Oct. 7, 1969

3,470,949
TUBULAR FINNED RADIATOR
Pierre Bouthors and Andre Colinet, Billancourt, France, assignors to Regie Nationale des Usines Renault, Billancourt, France
Filed Apr. 13, 1967, Ser. No. 630,763
Claims priority, application France, Apr. 26, 1966, 59,109
Int. Cl. F01p 3/18; F28f 1/30
U.S. Cl. 165—151                                   1 Claim

ABSTRACT OF THE DISCLOSURE

A finned tubular radiator consisting of stacked metal plates each formed with an orifice of which the edge is so shaped that the edges of the plate orifices fit into one another to constitute a tubular passage while holding the fins spaced from one another. The joints between the interfitting plates being sealed by means of gaskets, by cementing, welding or brazing. The tubular passage receives a separator in the form of a metal strip cemented, welded or brazed to the wall of said passage.

---

This invention relates to a finned radiator consisting of a plurality of plates formed with one or more orifices having pressed marginal portions, which are stacked upon one another to constitute finned passages.

This radiator consists of a stack of substantially identical metal plates having at least one orifice and their edges so shaped, bent or pressed that they fit into one another to constitute one or a plurality of tubular passages while keeping the fins spaced from one another.

The joints formed between the interfitting edges of said orifices may be sealed by means of gaskets, or by cementing, welding, brazing or braze-welding. Moreover, two opposite, substantially parallel external edges are flanged at an angle so selected that the flanged edges of each plate engage those of the adjacent plates when the edges of the plate orifices are fitted into one another.

For reasons of proper temperature balance, separators and agitators are frequently incorporated in the passages of tubular radiators for creating desirable perturbations in the fluid flow.

This invention is characterised in that a separator in the form of a metal strip is inserted in the passage of a radiator of the type set forth hereinabove, the width of this strip being sufficient to contact with its lateral edges the inner wall of the passages. The strip is assembled by cementing, welding, brazing or braze-welding same to the plates in which said passage is formed.

This construction is advantageous not only in that the separator constitutes a reinforcing member but also in that it can be utilized as a mounting element capable of holding the stacked fins with a certain pressure in proper position during the cementing, welding or braze-welding thereof.

The agitators consisting for example of rigid twisted strips are inserted in the assembly only after the plates and separators have been mounted in the radiator passages, that is, in the passages bounded by the separators.

This invention is also concerned with the use of a separator projecting initially from the orifices of the radiator passage to permit the holding of the radiator plates under a certain pressure by means of clamping or tightening members of which the locking action is exerted on said separator. The ends of the separator which project from these orifices are cut off upon completion of the brazing or welding operation.

This invention will now be described with reference to the accompanying drawing illustrating diagrammatically by way of example typical forms of embodiment of the finned tubular radiator constituting the subject-matter thereof. In the drawing.

Figure 1:
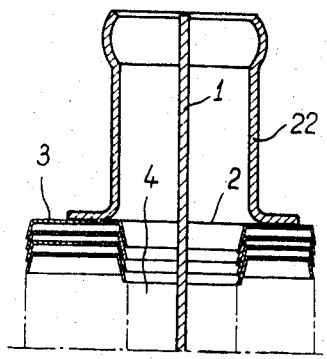
FIGURE 1 is a fragmentary section showing one end of a radiator according to this invention which is equipped with a separator.

To simplify the disclosure, the various figures of the drawing illustrate finned tubular radiators with only one passage for the heating or cooling fluid.

Referring first to FIGURE 1, a separator 1 is fitted in the orifices 2 of the radiator plates 3 with a force sufficient to cause these plates to be slightly pressed against one another. With the assembly thus held in position the plate edges are brazed by forming a brazed seam or bead within the passage 4, the brazed seam or bead spreading by capillarity when the assembly is heated, thus securing both the separator and the plates in position.

Upon completion of the brazing operation agitators 5 consisting of twisted strips are introduced on either side of the separator 1. If desired, the length of these agitators may be limited with respect to the length of the separator.

Of course, the separator may differ in shape from the one shown in the above example, provided that it permits the stacking of the plates and subsequently introducing the agitators.

Figure 4:
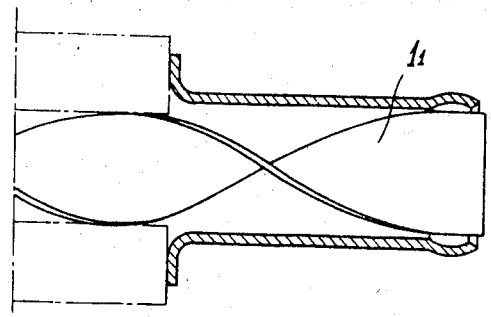
FIGURE 4 is a fragmentary sectional view showing one end of a radiator in which the separator is twisted to act jointly as an agitator.

As illustrated in FIGURE 4, a separator 1 twisted at one end may also be provided to act as an agitator. The separator may also be flat with projections cut out or inserted therein to act as an agitator means.

Figure 3:
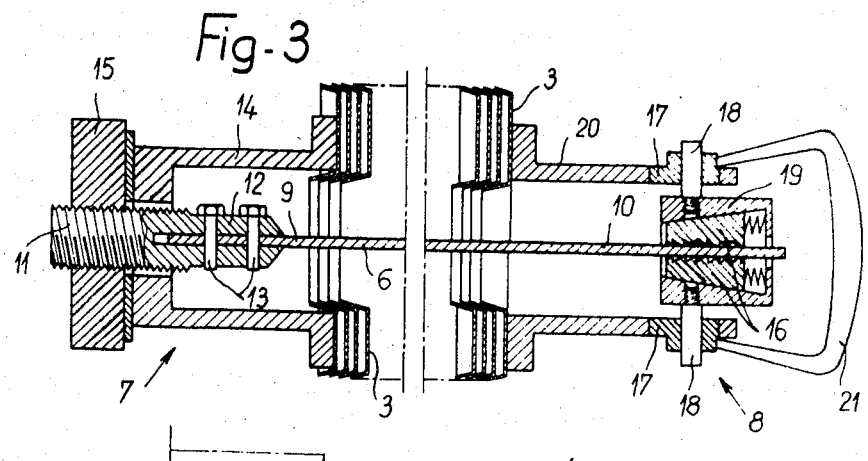
FIGURE 3 is an axial section showing the two ends of a radiator according to this invention during the assembly thereof, each end being equipped by way of example with a different clamping or tightening member.

The use of the separator as an element of the clamping or tightening device is illustrated in FIGURE 3.

In this case, the length of the metal strip 6 is initially considerably greater than that of the finished radiator.

When the assembly of plates 3 is slipped over the strip 6, a tightening member 7 or 8 is secured or locked to each end 9 and 10 emerging from either end of the passage.

The tightening device consisting of the tightening member and the separator can then be used for clamping the plates in their stacked condition, and the assembly may be completed by cementing, welding, brazing or braze-welding.

Then the clamping or tightening members are released and removed, whereafter the ends of the separator are cut to the desired length.

The tightening members may be of any suitable type, provided that they can bear against the ends of the separator and thus exert a pressure directed parallel to the separator against the plate assembly.

Two typical forms of embodiment of these tightening members are shown by way of example in the drawing.

Thus, the system illustrated in the left-hand portion of FIGURE 3 comprises a screw-threaded rod 11 formed with an end strap 12 adapted to be secured by means of bolts or screws 13 to the adjacent end portion of the separator which is suitably perforated to this end. An annular member 14 may be tightened against the end plate of the radiator by means of a nut 15 engaging the screw-threaded rod 11.

The clamping member 8 illustrated in the right-hand portion of FIGURE 3 is of the type comprising self-tightening jaws 18 responsive to eccentric members 17. These self-tightening jaws 16 engage the corresponding end 10 of the metal strip 6 so that when the two eccentric members 17 rotatably mounted on trunnions 18 rigid with the block 19 containing the jaws 16 are rotated an annular clamping member 20 is pressed against the end plate of the radiator. A handle 21 rigid with said eccentric members 17 permits of rotating these members journalled in bores formed to this end in the annular clamping member 20, as shown.

Figure 2:
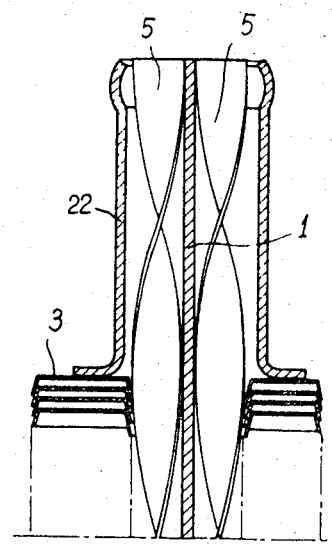
FIGURE 2 is another sectional view showing one end of a radiator constructed according to the teachings of this invention and equipped with a separator and two agitators.

Of course, end pieces or pipe or hose fittings may be secured to the ends of the radiator passages when assembling of the plates and separator. In this case, the tightening or clamping members are not compulsorily caused to exert their pressure directly against the end plates, this pressure being exerted through said end pieces and/or fittings. Such end pieces or fittings 22 are shown in FIGURES 1 and 2 of the drawings.

What is claimed is:

1. A tubular finned radiator for circulating heating and cooling fluids both in a tubular passage in said radiator and between the fins, said radiator comprising a plurality of substantially identical stacked metal plates, each said plate having at least one frustoconically shaped orifice the edges of which fit into the orifices of the adjacent plates to constitute said tubular passage while holding the plates spaced from each other, means sealing the joints along the interfitting edges of said stacked plates, two substantially parallel opposite external edges of said plates being bent at an angle to engage the bent edges of adjacent plates with said bent edges lying flat on one another forming a plurality of closed passages which prevent lateral escape of air in said passages, a fin clamping and reinforcement metal strip having a width sufficient to cause the lateral edges thereof to engage the inner wall of the passage and being fixedly mounted in each said tubular passage, said reinforcement strip forming a separator means, and agitators consisting of rigid twisted strips fixedly fitted into the passages formed by said separator.

References Cited

UNITED STATES PATENTS

| | | | |
|---|---|---|---|
| 1,563,182 | 11/1925 | Gargiulo | 165—151 |
| 1,940,804 | 12/1933 | Karmazin | 165—151 |
| 2,045,657 | 6/1936 | Karmazin | 165—151 |
| 2,144,506 | 1/1939 | Potter | 165—179 XR |
| 2,161,887 | 6/1939 | Ramsaur | 165—179 XR |
| 2,899,178 | 8/1959 | Dubin et al. | 165—182 |
| 3,195,626 | 7/1965 | Druseikis et al. | 165—179 |
| Re. 20,016 | 6/1936 | Hopkins | 165—151 XR |
| 1,947,606 | 2/1934 | Lonergan. | |
| 2,335,687 | 11/1943 | Modine | 138—38 |
| 2,492,298 | 12/1949 | Lenning | 165—179 XR |

FOREIGN PATENTS

| | | |
|---|---|---|
| 486,248 | 6/1938 | Great Britain. |
| 1,035,405 | 7/1966 | Great Britain. |

FRED C. MATTERN, JR., Primary Examiner

M. ANTONAKAS, Assistant Examiner

U.S. Cl. X.R.

165—182